United States Patent
Johns et al.

(10) Patent No.: US 6,931,493 B2
(45) Date of Patent: Aug. 16, 2005

(54) IMPLEMENTATION OF AN LRU AND MRU ALGORITHM IN A PARTITIONED CACHE

(75) Inventors: Charles Ray Johns, Austin, TX (US); James Allan Kahle, Austin, TX (US); Peichun Peter Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/346,294

(22) Filed: Jan. 16, 2003

(65) Prior Publication Data

US 2004/0143706 A1 Jul. 22, 2004

(51) Int. Cl.⁷ .............................................. G06F 12/08
(52) U.S. Cl. ..................................... 711/136; 711/128
(58) Field of Search ................................ 711/128, 129, 711/134, 136

(56) References Cited

U.S. PATENT DOCUMENTS 6,782,457 B2 * 8/2004 Hill et al. .................... 711/158
2003/0159003 A1 * 8/2003 Gaskins et al. ............. 711/128

* cited by examiner

*Primary Examiner*—Hiep T. Nguyen
(74) *Attorney, Agent, or Firm*—Carr LLP; Diana R. Gerhardt

(57) ABSTRACT

The present invention provides for determining an MRU or LRU way of a partitioned cache. The partitioned cache has a plurality of ways. There are a plurality of partitions, each partition comprising at least one way. An updater is employable to update a logic table as a function of an access of a way. Partition comparison logic is employable to determine whether two ways are members of the same partition, and to allow the comparison of the ways correlating to a first matrix indices and a second matrix indices. An intersection generator is employable to create an intersection box of the memory table as a function of a first and second matrix indices. Access order logic is employable to combine the output of the intersection generator, thereby determining which way is the most or least recently used way.

22 Claims, 4 Drawing Sheets

US 6,931,493 B2

IMPLEMENTATION OF AN LRU AND MRU ALGORITHM IN A PARTITIONED CACHE

TECHNICAL FIELD

The invention relates generally to cache management and, more particularly, to the replacement of ways within a multiple partitioned cache using a least recently used (LRU) and a most recently used (MRU) algorithm.

BACKGROUND

Caches are generally small, fast storage buffers employable to store information, such as code or data, in order for a processing device to more quickly and efficiently have access to the information. Typically, it is faster for the processing device to read the smaller memory of the cache than to read a main memory. With the rapid increase of intensive computational requirements, the importance of caches in computing systems will only increase.

Typically, when a cache does not have selected information, replacement logic will be employed to select the replacement candidate. The replacement logic can utilize the LRU function or the MRU function. One form of cache that employs the LRU and MRU functions is an "n-way set associative" cache. An "n-way set associative" cache with S sets has n cache locations in each set. Cache line b is mapped to set "b mod S" and may be stored in any of the n locations in that set. A partitioned n-way set associative cache stores the cache line in the partition. To determine whether block b is in the cache, set "b " mod "S" is searched associatively for the matching tag.

The LRU function determines the least recently used way within the cache of a given set. Then, the cache replaces the information targeted by the LRU function with the newer information. This cache line replacement allows the processor to quickly access the selected information the next time this information is requested. Furthermore, this replacement also increases the chances of the processor finding associated information within the cache, as the replaced way cache data can have temporal locality.

In other circumstances, a most recently used (MRU) function can be used. The MRU function determines the most recently used way in a cache. The MRU can be used for graphics images, for instance, when information is to be used once, then discarded.

Ways of cache can be partitioned. A partition is generally defined as a grouping of ways in a cache that shares associated update and replacement strategies. For instance, ways one, two and three could be updated under certain circumstances, and ways four, five, six, seven, and eight are updated under other circumstances, such as correspondence to a given address range as indicated by the address tag.

However, there are problems when employing conventional LRU or MRU functionality with a partitioned cache. For instance, in the LRU or MRU in conventional systems, a 24 bit LRU or MRU key can be used. However, to update the LRU or MRU key, the 24 bit key is read, rearranged and saved in the rewritten form. This is a time consuming and processing intensive process.

Therefore, what is needed is a cache partition management that overcomes the limitations of conventional cache partition management.

SUMMARY OF THE INVENTION

The present invention provides for determining an MRU or LRU way of a partitioned cache. The cache has a plurality of ways. There are a plurality of partitions, each partition comprising at least one way. An updater is employable to update a logic table as a function of an access of a way. An intersection generator is employable to create an intersection box of the memory table as a function of a first and second matrix indices. Partition comparison logic is employable to determine whether two ways are members of the same partition. Access order logic is employable to combine the output of the intersection generator.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
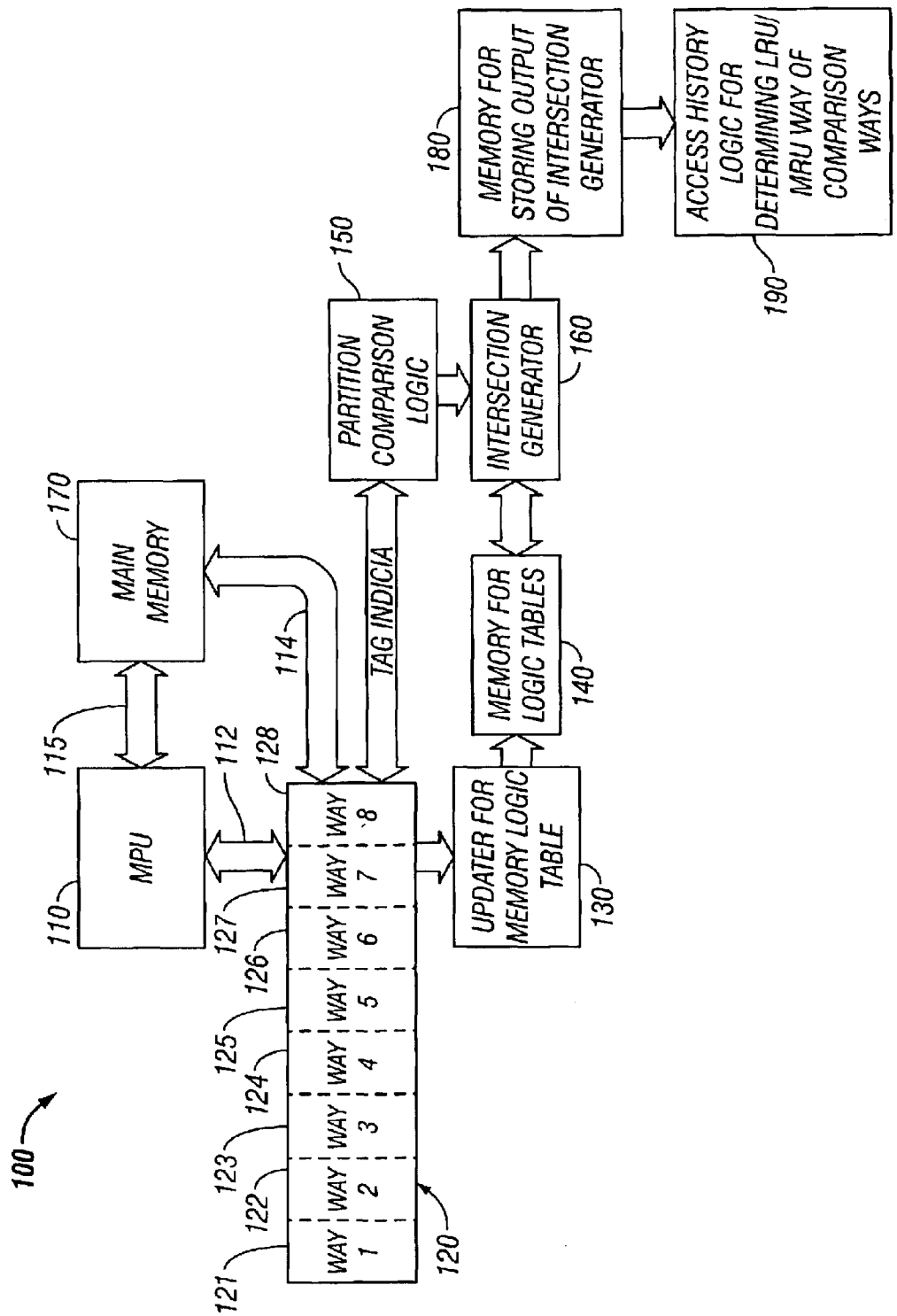
FIG. 1 schematically depicts a computer system having a partitioned cache, a logic table for tracking accesses of the ways of the cache, and access order logic.

Turning to FIG. 1, disclosed is an environment 100 for employment of a cache 120 comprising a plurality of ways 121–128. The cache 120 is coupled to a main processing unit (MPU) 110 through a buffer 112 and a main memory 170 through a buffer 114. The MPU 110 and the main memory 170 are coupled through a buffer 115.

In the illustrated embodiment, the cache 120 is a 512 Kilo Byte cache. The cache 120 is an 8-way-set associative cache, and each way 121–128 comprises 64 Kilo Bytes. Each way comprises 512 cache lines. Generally, the aggregation of the cache lines for a given cache line index is referred to as a set. The cache 120 has 512 sets. Each cache line of a set is 128 bytes. The ways of the cache 120 are furthermore divided into a plurality of partitions. In FIG. 1, ways 121 and 124 are members of a first partition, ways 122, 123 and 126 are members of a second partition, and ways 125, 127 and 128 are members of a third partition. However, other configurations of partitions of ways are within the scope of the present invention.

The cache 120 is also coupled to an updater engine 130. Generally, the updater engine 130 stores values into a memory for logic tables 140 whenever a way 121–128 of the cache 120 is accessed. Each set has its own logic table. In the illustrated embodiment, there are 512 distinct tables in the memory for logic tables 140. For instance, set 0 has its own corresponding logic table showing the access order of its ways, set 1 has its own corresponding logic table showing its access order, and so on.

In one embodiment, each logic table comprises a square matrix having the same number of rows and columns as the number of ways 121–128. For instance, in the illustrated embodiment of FIG. 2B, the table of the memory 140 is an eight by eight table, because there are eight ways 121–128. The information within each 8×8 memory table 290 can be expressed as a 28 bit array. Generally, this is because the information within the 8×8 memory table is expressed in the bottom left, beneath the diagonal of the table. In a further embodiment, the information is mirrored above the diagonal, and the values all inverted. For instance, if $M_{23}$ equals "0", $M_{32}$ equals "1".

Turning back to FIG. 1, in one embodiment, the updater engine 130 first selects the appropriate matrix corresponding to the selected set. Then the updater engine 130 determines the diagonal within the set matrix of the memory for logic tables 140. Within the diagonal of the logic table 290, the updater engine 130 selects the box "$M_{way,way}$" corresponding to the most recently accessed way.

Then, the updater engine 130 inserts "1"s into all entries that have the same row number as the selected diagonal box but have lower column numbers than the selected box. For instance, if way 125 is accessed, then columns 1 through 4 of row 5 are filled with "1"s. Furthermore, the updater engine 130 inserts "0"s into all entries that have the same column number as the selected box, but have higher row numbers than the selected box "i". For instance, if way 125 were accessed, then column 5, rows 6 through 8 of column 5, inclusive, are filled with "0"s.

The updating of the logic table of the memory 140 continues all the time that ways are accessed. In one embodiment, the updater engine 130 overwrites previous values within the logic table, representing previous accesses of a way, with new values representing a new access. For instance, if another way is accessed, way 7, then all entries to the left of 7,7 are replaced with "1"s, and all entries beneath 7,7 are replaced with "0"s. However, replacing all entries to the left of 7,7 with "1"s can also overwrite a "0" value stored in box 7,5 previously created by accessing the way 5.

Coupled to the memory for logic tables 140 is an intersection generator 160. In one embodiment, a first matrix index correlates to a specified horizontal row, and a second matrix index correlates to a specified vertical column. The first and second matrix indices correlate to the two ways of the cache 120 that are to have their access order compared to one another. The intersection generator 160 takes the first and second matrix indices and employs their numbers as row or column number, as appropriate, to find an intersection point in the memory 140.

In FIG. 1, when determining the MRU or LRU way, matrix indexes are used that correspond to both the particular ways that are to be compared. Generally, this is because the first and second matrix indices are determined to correlate to ways in the same partition by partition comparison logic 150. This determination is typically performed by the reading of the address tag of the requested data address, and determining which ways correspond to that requested data address. In one embodiment, the MRU way is determined by comparing the first and second matrix index. In another embodiment, the LRU way is determined by comparing the first and second matrix index.

These intersection values are then transferred to a comparison memory 180. An access order logic 190 employs the intersection values stored within the comparison memory 180 to determine which of the comparison ways is either the LRU way or the MRU way for a particular set. Typically, this is accomplished through such means as ANDing the values generated by the intersection engine together. This ANDing together of all intersection values corresponding to the ways belonging to the same partition generates either a replacement value of "1" or a replacement value of "0." The value of 1 represents that the way is to be replaced by the LRU or MRU algorithm, as appropriate. The replacement value of "0" represents that the way is not to be replaced.

Figure 2A:
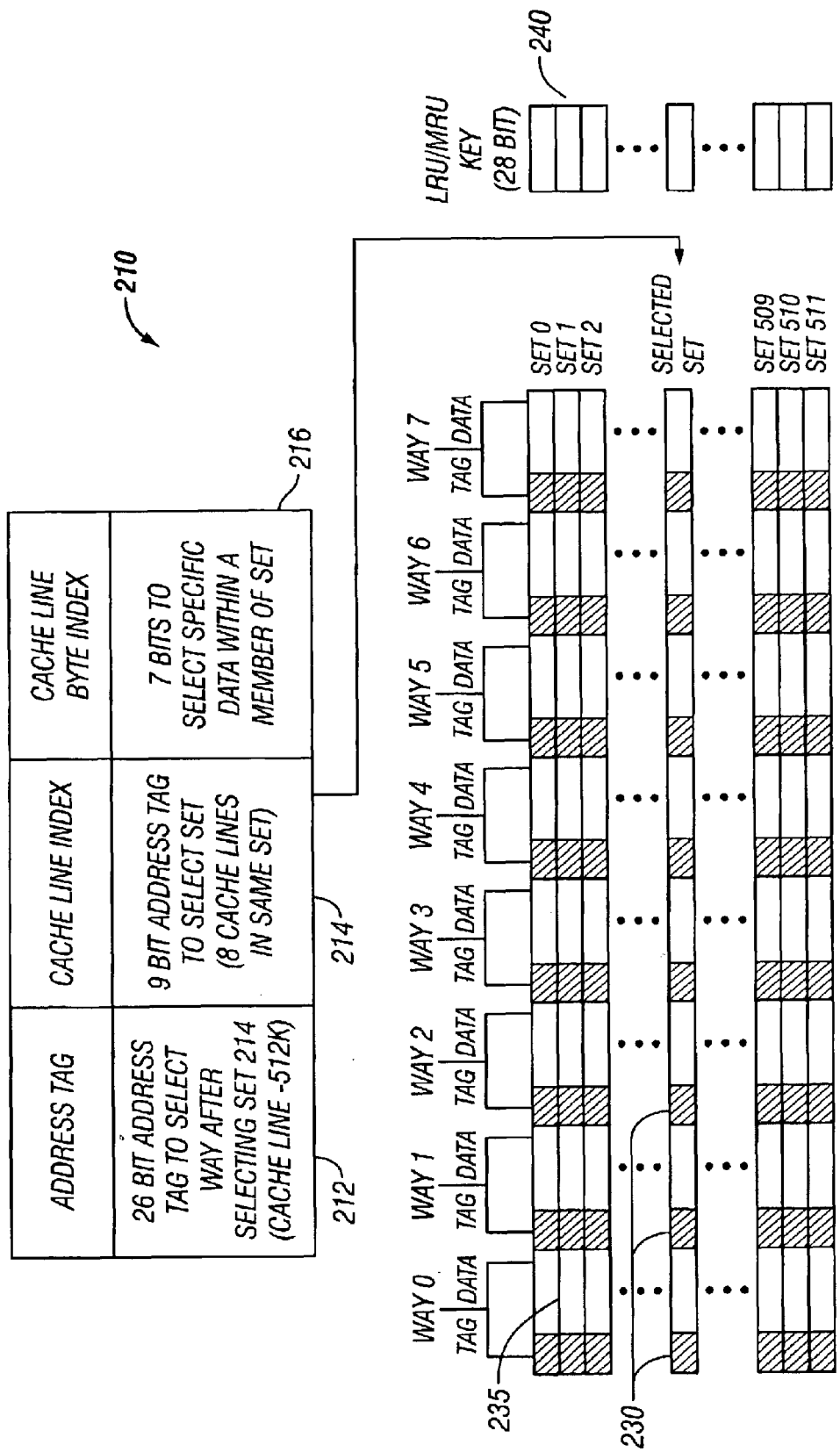
FIG. 2A illustrates a memory address for employment with the logic table.

Turning now to FIG. 2A, schematically depicted is a requested address 210 containing information employable to select a way within a set. The requested address 210 contains a request to the cache 120 for a specific piece of information. The requested address 210 comprises a first 26 bit address tag 212. The requested address 210 further comprises a second 9 bit cache line set index to select a set 214, and a third 7 bit for the cache line byte offset 216. Generally, the requested address 210 corresponds to an address for information that the MPU 110 requests for the cache 120 to send to the MPU 110

Figure 2B:
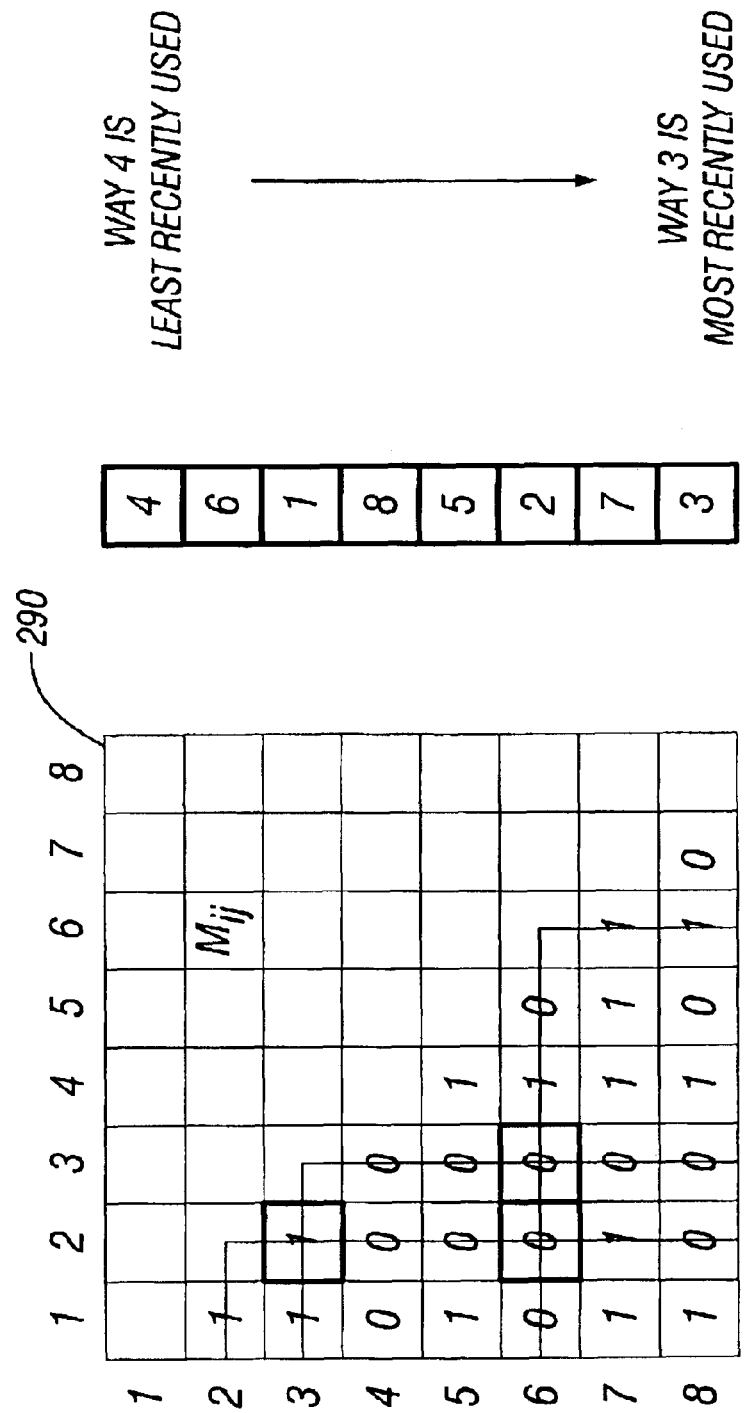
FIG. 2B illustrates one example of entries of a logic table.

Address tags 230 are stored within the cache 120. Each address tag corresponds to different information that has been previously stored in the cache 120. In FIG. 2B, each set that is stored within the cache 120 has 8 address tags 230. All address tags 230 of the selected set 214 are compared to the address tag 212. If the desired address tag 212 is found in the set 214 within the cache 120 (that is, the address tag 212 equals the address tag 230 for a way of the selected set), there is a "hit," and the cache 120 is notified that the data 235 is within the appropriate corresponding way 121–128.

Each set 214 has its own associated memory matrix logic table 140. The updater 130 updates the memory matrix 140 associated with the "hit" set as a function of the set selection index 214. The ways are represented by boxes on the diagonal through the memory matrix. Therefore, "1"s are put to the left of the same row of the box representing the accessed way, and "0"s are put in the same column of the box representing the accessed way.

However, if there is no hit, then it is determined to which partition the requested address corresponds. In one embodiment, this is performed by looking at the 28 bit address tag 212 and comparing it to address ranges corresponding to cache ways. Then, within that determined partition, the ways are compared to one another to determine which way one is the LRU or MRU way. This is generally performed by looking at the LRU/MRU key 240, which comprises the information for the updated for memory logic table 130.

Turning now to FIG. 2B, illustrated is an example of a memory for logic tables 140 after several ways of the cache 120 have been accessed for a particular set. As is illustrated in FIG. 2B, the access order of each way 121–128 can overwrite the previous values entered into the logic table by previous accessing of other ways. For the 8×8 table 290 of FIG. 2B, the table 290 can be expressed as a 28 bit key LRU or MRU. In other words, there are 28 entries in the table, and each entry is a "1" or a "0". In one embodiment, a 28 bit LRU/MRU key is stored with each set of the cache 120.

When a way of the logic table is updated, the updater engine 130 determines the diagonal of the accessed way within the set matrix of the memory for logic tables 140. Within the diagonal of the memory for logic tables 140, the updater engine 130 selects the box "$M_{way,way}$" corresponding to the most recently accessed way.

For instance, if way 125 is accessed, the updater engine 130 selects box "5,5" of the diagonal of the logic table. Then, the updater engine 130 inserts "1"s into all entries that have the same row number as the selected diagonal box but have lower column numbers than the selected box. For instance, if way 125 is accessed, then columns 1 through 4 of row 5 are filled with "1"s. Furthermore, the updater engine 130 inserts "0"s into all entries that have the same column number as the selected box, but have higher row numbers than the selected box "i." For instance, if way 125 were accessed, then column 5, rows 6 through 8 of column 5, inclusive, are filled with "0"s. The updating of the logic table of the memory 140 continues all the time that ways are accessed.

One advantage of this approach is that when updating the information within the table, other entries that are not correlated to the accessed cache are not overwritten or moved. For instance, if way 4 is accessed, although entries relating to way 4 are updated, entries not relating to way 4 are not updated. The intersection of matrix index 5 and matrix index 6, $M_{56}$, would not be updated, for instance.

In FIG. 2B, when determining the MRU or LRU way, matrix indexes are used that correspond to the particular ways to be tested. Matrix indices correlate to ways of the cache 120 that are to have their access sequences compared to one another. In one embodiment, the MRU way is determined. In another embodiment, the LRU way is determined.

In one example, the first matrix index correlates to way 123, the intersection generator 160 looks at an intersection entry and correlates the first matrix index with a second matrix index which comprise all other columns in the look-up table memory 140. These intersection entries will be either "1" or "0," and depend on the access order of the caches. According to the memory for logic tables 140, in order to determine the most recently used way, if $M_{ij}=1$, that means that way "i" is more recently accessed than way "j". All boxes in the memory for logic tables 140 that are in the same row with lower column numbers than the number of the selected way are read, as are the boxes in the same column as the number of the comparison ways. The above process is repeated for any other ways in the same partition as the selected way. The intersection boxes $M_{32}$, $M_{62}$, $M_{63}$, represent the comparisons of relative access order between any two ways of the selected partition containing ways 2, 3, and 6 in the cache 120.

For instance, the equations for determining the LRU way within the partition containing way 122(way2), 123(way3), and 126(way6), are expressed as follows:

$$L_2=\{(notS_{21}+notM_{21})(notS_{32}+M_{32})(notS_{42}+M_{42})(notS_{52}+M_{52})(notS_{62}+M_{62})(notS_{72}+M_{72})(notS_{82}+M_{82})\}; \quad 1.$$

$$L_3=\{(notS_{31}+notM_{31})(notS_{32}+notM_{32})(notS_{43}+M_{43})(notS_{53}+M_{53})(notS_{63}+M_{63})(notS_{73}+M_{73})(notS_{83}+M_{83})\}; \text{ and} \quad 2.$$

$$L_6=\{(notS_{61}+notM_{61})(notS_{62}+notM_{62})(notS_{63}+notM_{63})(notS_{64}+M_{54})(notS_{65}+M_{65})(notS_{76}+M_{76})(notS_{86}+M_{86})\}. \quad 3.$$

In one embodiment, the values Lx ($L_2$, $L_3$, $L_6$ and so on) are generated in parallel, as information required for the calculation of $L_2$, $L_3$ and $L_6$ is contained within the Table of FIG. 2B. The equation for a given $L_x$ is generally generated by taking all column values to the left of the box corresponding to the way to be tested for LRU or MRU status and the rows of all boxes beneath the box corresponding to the way. For instance, in the above equations, $M_{31}$ and $M_{32}$ are in the same row as box 3,3 (which corresponds to way 3, or $L_3$), and $M_{43}$, $M_{53}$, $M_{63}$, $M_{73}$, and $M_{83}$ are in the same column as $L_3$ (box 3,3). These values are determined by the intersection generator 160.

Furthermore, for a given $L_x$, the $M_{ij}$ value is inverted when the column number is less than the row number for a given $M_{ij}$. For instance, in the equation of $L_2$, $M_{21}$ is inverted, but $M_{32}$ is not. Similarly, in the equation of $L_6$, $M_{62}$ is inverted, but $M_{68}$ is not.

$S_{ij}$ represents whether or not the two ways are in the same selected partition. $S_{ij}$ equals "1" if way i is in the same selected partition as way j, and $S_{ij}$ equals "0" if way i is not in the same selected partition as way j.

In a further embodiment, to find either the LRU or MRU way, an XOR combination with a most recently used configuration ("MC") value is used. As is understood by those of skill in the art, if a given logical value is XORed with zero, the given logical value does not change. If the logical value is XORed with one, the given logical value is inverted. In the further embodiment, if MC equals zero (that is, the non-inverting XOR is performed), the LRU way is determined. If MC equals one (that is, an inverting XOR is performed), the MRU way is determined.

$S_i=1$ means way i is in the selected partition.
$S_{ij}=1$ means both way i and way j are in the selected partition.

$L_1=S_1$ and
(not $S_{21}$+($M_{21}$ xor MC)) and
(not $S_{31}$+($M_{31}$ xor MC)) and
(not $S_{41}$+($M_{41}$ xor MC)) and
(not $S_{51}$+($M_{51}$ xor MC)) and
(not $S_{61}$+($M_{61}$ xor MC)) and
(not $S_{71}$+($M_{71}$ xor MC)) and
(not $S_{81}$+($M_{81}$ xor MC));
$L_2=S_2$ and
(not $S_{21}$+not($M_{21}$ xor MC)) and
(not $S_{32}$+($M_{32}$ xor MC)) and
(not $S_{42}$+($M_{42}$ xor MC)) and
(not $S_{52}$+($M_{52}$ xor MC)) and
(not $S_{62}$+($M_{62}$ xor MC)) and
(not $S_{72}$+($M_{72}$ xor MC)) and
(not $S_{82}$+($M_{82}$ xor MC));
$L_3=S_3$ and
(not $S_{31}$+not($M_{31}$ xor MC)) and
(not $S_{32}$+not($M_{32}$ xor MC)) and
(not $S_{43}$+($M_{43}$ xor MC)) and
(not $S_{53}$+($M_{53}$ xor MC)) and
(not $S_{63}$+($M_{63}$ xor MC)) and
(not $S_{73}$+($M_{73}$ xor MC)) and
(not $S_{83}$+($M_{83}$ xor MC));
$L_4=S_4$ and
(not $S_{41}$+not($M_{41}$ xor MC)) and
(not $S_{42}$+not($M_{42}$ xor MC)) and
(not $S_{43}$+not($M_{43}$ xor MC)) and
(not $S_{54}$+($M_{54}$ xor MC)) and (not $S_{64}$+($M_{64}$ xor MC)) and
(not $S_{74}$+($M_{74}$ xor MC)) and
(not $S_{84}$+($M_{84}$ xor MC));
$L_5=S_5$ and
(not $S_{51}$+not($M_{51}$ xor MC)) and
(not $S_{52}$+not($M_{52}$ xor MC)) and
(not $S_{53}$+not($M_{53}$ xor MC)) and
(not $S_{54}$+not($M_{54}$ xor MC)) and
(not $S_{65}$+($M_{65}$ xor MC)) and
(not $S_{75}$+($M_{75}$ xor MC)) and
(not $S_{85}$+($M_{85}$ xor MC));
$L_6=S_6$ and
(not $S_{61}$+not($M_{61}$ xor MC)) and
(not $S_{62}$+not($M_{62}$ xor MC)) and
(not $S_{63}$+not($M_{63}$ xor MC)) and
(not $S_{64}$+not($M_{64}$ xor MC)) and
(not $S_{65}$+not($M_{65}$ xor MC)) and
(not $S_{76}$+($M_{76}$ xor MC)) and
(not $S_{86}$+($M_{86}$ xor MC));
$L_7=S_7$ and
(not $S_{71}$+not($M_{71}$ xor MC)) and
(not $S_{72}$+not($M_{72}$ xor MC)) and
(not $S_{73}$+not($M_{73}$ xor MC)) and
(not $S_{74}$+not($M_{74}$ xor MC)) and
(not $S_{75}$+not($M_{75}$ xor MC)) and
(not $S_{76}$+not($M_{76}$ xor MC)) and
(not $S_{87}$+($M_{87}$ xor MC));
$L_8=S_8$ and
(not $S_{81}$+not($M_{81}$ xor MC)) and
(not $S_{82}$+not($M_{82}$ xor MC)) and
(not $S_{83}$+not($M_{83}$ xor MC)) and
(not $S_{84}$+not($M_{84}$ xor MC)) and
(not $S_{85}$+not($M_{85}$ xor MC)) and
(not $S_{86}$+not($M_{86}$ xor MC)) and
(not $S_{87}$+not($M_{87}$ xor MC));

Generally, not $S_{xy}$ represents that any cache that is not within the same partition becomes the value "1" and drops out. For instance, if the way 2 and the way 4 are not in the same partition, not $S_{24}$ equals 1, (1+$M_{24}$)=1, regardless of the $M_{24}$ value.

Figure 3:
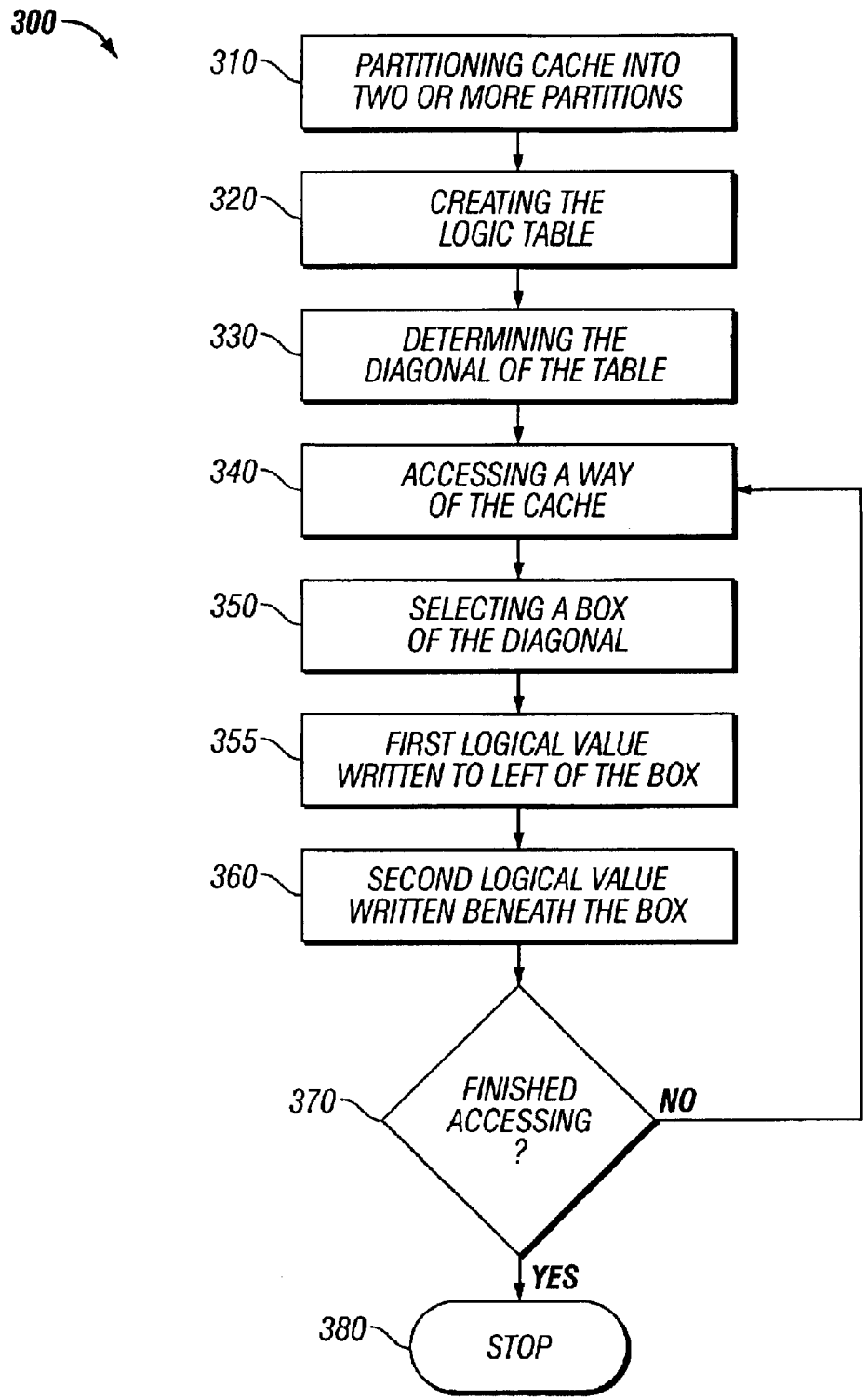
FIG. 3 illustrates a method flow chart for creating and updating a logic table when accessing a way within the partitioned cache.

Turning now to FIG. 3, illustrated is a method 300 for generating a logic table for displaying the access order of ways 121–128. In step 310, the ways 121–128 are partitioned and grouped into two or more partitions. In step 320, the logic table in the memory 140 is created. In step 330, the updater 130 finds the diagonal of the logic table. Different $M_{xx}$s of the diagonal, such as $M_{11}$, $M_{22}$ and so on, will be used by the updater for illustrating the updating of way 121, way 122, and so on.

In step 340, a way of the cache 120 is accessed. This accessing can be an overwrite of a cache line within a way or the reading of a cache line within a way. In step 350, the updater 130 selects one input on the diagonal of the cache. If the accessed way is 121, then diagonal placeholder $M_{11}$ is selected. If the accessed way is 122, then diagonal placeholder $M_{22}$ is selected, and so on.

In step 355, a first logical value is written to the left entries of the diagonal placeholder selected in step 350. In one embodiment, the first logical value is a "1." In step 360, a second logical value is written to the entries beneath the intersection box selected in step 350. In one embodiment, the second logical value is a "0."

In step 370, the updater 130 determines if there are more ways to be accessed. If there are more ways to be accessed, step 340 re-executes. If there are no more ways to be accessed, then the method 300 stops in step 380.

It is understood that the present invention can take many forms and embodiments. Accordingly, several variations may be made in the foregoing without departing from the spirit or the scope of the invention. The capabilities outlined herein allow for the possibility of a variety of implementations. This disclosure should not be read as preferring any particular implementations, but is instead directed to the underlying mechanisms on which these implementations can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for generating a logic table for way management of a partitioned cache, comprising:
   accessing a way of the partitioned cache, the way further having an associated way index;
   selecting a box of the logic table as a function of the way index;
   entering a first logical value to all boxes of the logic table on the same row number as the way index that also have a column value less than the column value of the selected box; and
   entering a second logical value to all boxes of the logic table on the same column number as the associated way index that also have a row value greater than the row value of the selected box.

2. The method of claim 1, wherein generating the logic table further comprises employing a triangular logic table.

3. The method of claim 1, wherein the logic table comprises a 28 bit key.

4. The method of claim 1, wherein generating the logic table further comprises creating an eight by eight triangular logic table.

5. The method of claim 1, wherein the step of entering a first logical value comprises entering a one.

6. The method of claim 1, wherein the step of entering a second logical value comprises entering a zero.

7. The method of claim 1, wherein the step of entering a first value further comprises overwriting a previously entered value.

8. A method of employing a logic table for way management, comprising:
   selecting a first matrix index;
   selecting a second matrix index;
   generating an intersection box of the logic table from the selected first matrix index and the selected second matrix index;
   combining a value stored in the intersection box with a most recently used configuration value;
   determining if an associated first and second cache ways are in the same partition; and generating a value by combining the results of the combining step with the determining step.

9. The method of claim 8, wherein the first matrix index corresponds to a row value in the logic table, and the second matrix index corresponds to a column value in the logic table.

10. The method of claim 8, further comprising determining whether a way is in a selected partition and combining the determination result with the generated value.

11. The method of claim 8, wherein the step of combining a value stored in the intersection box with a most recently used configuration value further comprises an XOR combination.

12. The method of claim 8, wherein the most recently used configuration value comprises a first value employable for determining an LRU way, and a second value employable for determining an MRU way.

13. The method of claim 8, further comprising selecting all intersection boxes corresponding to ways of the selected partition.

14. The method of claim 13, further comprising employing the values within the selected intersection boxes to determine the MRU way.

15. The method of claim 13, further comprising employing the values within the selected intersection boxes to determine the LRU way.

16. The method of claim 9, further comprising employing an address tag to determine whether a way is in a selected partition.

17. A system for determining an MRU or LRU way of a partitioned cache, comprising:
   a cache having a plurality of ways;
   a plurality of partitions, each partition comprising at least one way;
   an updater employable to update a logic table as a function of an access of a way;
   an intersection generator, employable to create an intersection box of the memory table as a function of first matrix indices and second matrix indices;
   partition comparison logic, employable to determine whether two ways are members of the same partition; and
   access order logic, employable to combine a value stored in the intersection box and the output of the partition comparison logic.

18. The system of claim 17, wherein the access order logic is employable to determine the LRU way.

19. The system of claim 17, wherein the access order logic is employable to determine the MRU way.

20. The system of claim 17, further comprising a plurality of logic tables wherein each logic table corresponds to a set of the cache.

21. A computer program product for employing a logic table for way management, the computer program product having computer readable storage medium with a computer program stored thereon, the computer program comprising:
   computer code for selecting a first matrix index;
   computer code for selecting a second matrix index;
   computer code for generating an intersection box of the logic table from the selected first matrix index and the selected second matrix index;
   computer code for combining a value stored in the intersection box with a most recently used configuration control value;
   computer code for determining if an associated first and second way are also in the same partition; and
   computer code for generating a value by combining the results of the combining step with the determining step.

22. A processor for employing a logic table for way management, the processor including a computer program comprising:
   computer code for selecting a first matrix index;
   computer code for selecting a second matrix index;
   computer code for generating an intersection box of the logic table from the selected first matrix index and the selected second matrix index;
   computer code for combining a value stored in the intersection box with most recently used configuration value;
   computer code for determining if an associated first and second way are also in the same partition; and
   computer code for generating a value by combining the results of the combining step with the determining step.

* * * * *